US007004585B2

(12) United States Patent
Lindacher

(10) Patent No.: US 7,004,585 B2
(45) Date of Patent: *Feb. 28, 2006

(54) OPHTHALMIC LENS HAVING AN OPTICAL ZONE BLEND DESIGN

(75) Inventor: Joseph Michael Lindacher, Suwanee, GA (US)

(73) Assignee: Novartis AG, Basel (CH)

( * ) Notice: Subject to any disclaimer, the term of this patent is extended or adjusted under 35 U.S.C. 154(b) by 0 days.

This patent is subject to a terminal disclaimer.

(21) Appl. No.: 10/766,194

(22) Filed: Jan. 28, 2004

(65) Prior Publication Data

US 2004/0257526 A1    Dec. 23, 2004

Related U.S. Application Data

(60) Provisional application No. 60/446,658, filed on Feb. 11, 2003.

(51) Int. Cl.
G02C 7/06 (2006.01)
G02C 7/04 (2006.01)

(52) U.S. Cl. ................ 351/161; 351/177; 623/6.27

(58) Field of Classification Search ........... 351/160 R, 351/160 H, 161, 162, 177; 623/6.24, 6.27, 623/6.28
See application file for complete search history.

(56) References Cited

U.S. PATENT DOCUMENTS

| 4,537,479 A * | 8/1985 | Shinohara et al. .......... 351/169 |
| 4,580,882 A | 4/1986 | Nuchman et al. ............ 351/161 |
| 4,938,583 A * | 7/1990 | Miller ....................... 351/161 |
| 5,483,304 A | 1/1996 | Porat ......................... 351/161 |
| 5,691,797 A | 11/1997 | Seidner et al. ............. 351/161 |
| 5,724,120 A | 3/1998 | Svochak et al. ............ 351/161 |
| 5,740,707 A | 4/1998 | Svochak et al. ............ 82/1.11 |
| 5,743,159 A | 4/1998 | Svochak et al. ............ 82/168 |
| 6,030,077 A | 2/2000 | Sawano et al. ............. 351/161 |
| 6,260,966 B1 | 7/2001 | Sawano et al. ............. 351/161 |
| 6,457,826 B1 | 10/2002 | Lett .......................... 351/161 |
| 2002/0159025 A1 * | 10/2002 | Legerton et al. ......... 351/160 R |
| 2005/0099595 A1 * | 5/2005 | Lindacher ................. 351/161 |

OTHER PUBLICATIONS

Copy of a PCT Invitation to Pay Additional Fees and Equivalency list.
Eupopean Search Report.

* cited by examiner

Primary Examiner—Scott J. Sugarman
Assistant Examiner—Darryl J. Collins
(74) Attorney, Agent, or Firm—Jian S. Zhou

(57) ABSTRACT

An ophthalmic lens, such as multifocal contact lens, that is worn on the surface of the eye and has a blended design for a segmented optical zone. The lens has an anterior surface and an opposite posterior surface, wherein the anterior surface includes a vertical meridian, a horizontal meridian, a central optical zone having at least a first optical zone for primary gaze, a second optical zone for down-gaze and an optical blending zone between the first and second optical zones. The optical blending zone has a surface that ensures a smooth surface transition from the first optical zone to the second optical zone and that allows the first and second optical zone to be designed independently and optimally so that ghost images or blur from the transition between the first and second optical zones can be minimized or eliminated. Image blur from the blend zone that subtends the pupil is minimized by the magnitude of the curvature of the blend zone. The optical zones will have the optimal aberration parameters to control vision.

30 Claims, 2 Drawing Sheets

OPHTHALMIC LENS HAVING AN OPTICAL ZONE BLEND DESIGN

This application claims the benefit under 35 U.S.C. § 119 (e) of United States provisional application No. 60/446,658 filed Feb. 11, 2003, incorporated by reference in its entirety.

BACKGROUND OF THE INVENTION

1. Field of the Invention

The present invention generally relates to ophthalmic lenses. More particularly, the invention relates to a multifocal contact lens that includes a blended design for a segmented optical zone.

2. Description of the Related Art

Contact lenses are ophthalmic lenses worn on the anterior cornea that are widely used for correcting many different types of vision deficiencies. These include defects such as near-sightedness (myopia) and far-sightedness (hypermetropia), astigmatism, and defects in near range vision usually associated with aging (Presbyopia). A typical single vision contact lens has a real or virtual focus, which is the point at which parallel rays of light focus when the lens is placed perpendicular to the parallel rays, and an optical axis, which is an imaginary line drawn from the focus to the center of the optical zone of the lens. A posterior surface of the contact lens fits against the cornea and an opposite anterior surface has an optical zone that refracts light to correct vision. In the case of a typical spherical lens, the optical zone has a single radius of curvature; whereas the distance from any point on the optical zone to a point on the optical axis referred to as the center of curvature.

A bifocal lens has at least two optical zones, typically on the anterior surface, of the lens: a distance optical zone, for primary gaze; and a near optical zone, for down-gaze (e.g., while reading). Bifocal contact lenses are typically concentric or segmented in configuration. In a conventional, simultaneous vision, concentric bifocal contact lens, a first, centrally located, circular correction zone constitutes either distant or near vision correction, while a second annular correction zone surrounding the first zone provides the corresponding near or distance vision correction, respectively. In a conventional, alternating vision, bifocal contact lens of the segmented or translating type, the lens is divided into two optical zones. Usually, the upper zone is for distance vision correction whereas the lower zone is for near vision correction. With such a translating lens, the distance portion (upper zone) of the lens is predominately in front of the pupil of the eye in primary gaze, while in down-gaze, the add power or near portion (lower zone) of the lens is predominately aligned to the pupil. Effective use of an alternating vision bifocal contact lens requires translation of the optical zones across the pupil when the eye changes from primary gaze to a downward gaze. In such a situation, the lens must move such that the pupil is predominately subtended by the distance zone for primary gaze and predominately subtended by the near zone for down-gaze. The design of a segmented optical zone contact lens requires surface blending between the distance portions such that vision is not degraded as the contact lens translates from one optical zone to another across the pupil. Specifically, in a bifocal, segmented optical zone contact lens, the images, on the retina, from both an upper and lower optical zones must be laterally coincident to minimize or eliminate ghost images. Ghost images are caused when the images from multiple optical zones have lateral separation. Additionally, the blend zone between the upper and lower optical zones can create a variable power optical zone with lateral image separation that likewise causes ghost images to the wearer.

Therefore, it would be advantageous to provide a bifocal or multifocal contact lens characterized by having minimal or no ghost images from segmented optical zones. It is accordingly to such an ophthalmic lens, and the design aspects that this design configuration permits, that the present invention is primarily directed.

SUMMARY OF THE INVENTION

The present invention is an ophthalmic lens, such as bifocal contact lens, which is worn on the anterior surface of the cornea and has a blended design for a segmented bifocal or multifocal optical zone. The lens has an anterior surface and an opposite posterior surface, wherein the anterior surface includes a vertical meridian, a horizontal meridian, a central optical zone having at least a first optical zone for primary gaze, a second optical zone for down-gaze and an optical blending zone between the first and second optical zones. The optical blending zone has a surface that ensures a smooth surface transition from the first optical zone to the second optical zone and that allows the first and second optical zone to be designed independently and optimally so that ghost images or blur from the transition between the first and second optical zones can be minimized or eliminated. In a preferred embodiment, the optical blending zone preferably has mirror symmetry with respect to a plane cutting through the vertical meridian, outwardly flares from the vertical meridian towards the periphery of the contact lens 10. The width of the blend zone 16 increases toward the periphery of the optical zones to provide controlled curvature, controlled optical power, and a smooth surface transition to the optical zone-to-lenticular zone blend. The optical blend zone can also include a curvature magnitude to refract light away from the macular region of the eye.

The invention also includes a method of manufacturing an ophthalmic lens worn on the anterior surface of the cornea and having a blended design for a segmented optical zone through the steps of designing the anterior surface and the posterior surface the ophthalmic lens, wherein the anterior includes a vertical meridian, a horizontal meridian, a central optical zone having at least a first optical zone for primary gaze, a second optical zone for down-gaze and an optical blending zone between the first and second optical zones. The optical blending zone has a surface that ensures a smooth surface transition from the first optical zone to the second optical zone and that allows the first and second optical zone to be designed independently and optimally so that ghost images or blur from the transition between the first and second optical zones can be minimized or eliminated. In a preferred embodiment, the optical blending zone preferably has mirror symmetry with respect to a plane cutting through the vertical meridian, outwardly flares from the vertical meridian towards the periphery of the contact lens 10. The width of the blend zone 16 increases toward the periphery of the optical zones to provide controlled curvature, controlled optical power, and a smooth surface transition to the optical zone-to-lenticular zone blend. The optical blend zone can also include a curvature magnitude to refract light away from the macular region of the eye.

The present invention accordingly provides an ophthalmic lens that has a smooth surface blend zone between the optical segments. The blend zone of the lens includes a curvature of a magnitude such that it completely refracts the light away from the Macular region of the eye, of the wearer, to further minimize the appearance of ghost images or image blur.

Other objects, advantages, and features of the present invention will become apparent after review of the hereinafter set forth Brief Description of the Drawings, Detailed Description of the Invention, and the Claims.

DETAILED DESCRIPTION OF THE INVENTION

Figure 1:
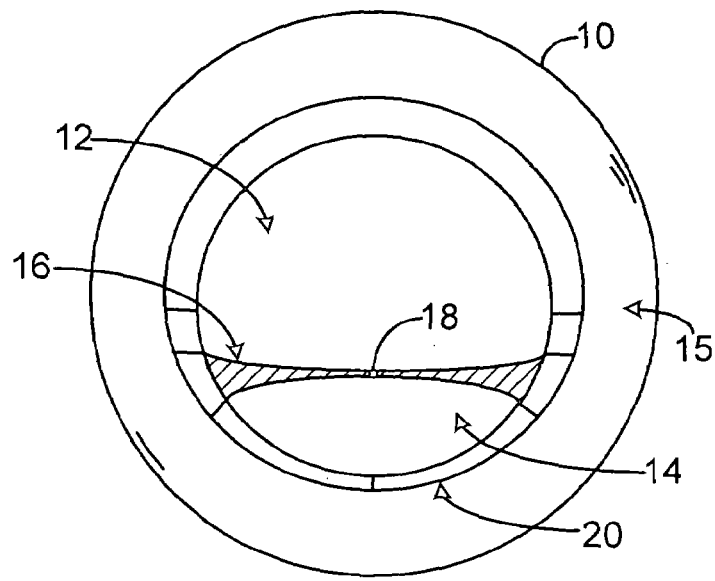
FIG. 1 is a front view (anterior surface) of a bifocal contact lens having an optical zone with blended design of the transitional zone according to a preferred embodiment of the invention.

With reference to the figures in which like numerals represent like elements throughout, FIG. 1 illustrates a bifocal contact lens 10 worn on the anterior surface of the cornea, of the eye 30 (FIGS. 2A and 2B), according to a preferred embodiment. In accordance with this preferred embodiment of the invention, the bifocal contact lens 10 has an anterior surface (or front curve) and an opposite posterior surface (or base curve) which is rest on the cornea of the eye when worn by a user. The anterior surface includes a vertical meridian, a horizontal meridian, a central optical zone, a peripheral blending zone 20 extending outwardly from the central optical zone, and a peripheral (e.g., lenticular zone) 15 surrounding the blending zone.

"A lenticular" refers to a peripheral non-optical surface zone on the anterior surface of a contact lens between the optical zone and the edge. The primary function of the lenticular is to control the thickness of the lens edge and/or lens positional stability and/or to provide wearer's comfort.

It should be understood that the central optical zone is preferably concentric with the geometric center of the anterior surface, though the center of the central optical zone can be deviated from the geometric center of the anterior surface by up to 2 mm.

The presence of a peripheral blending zone between the peripheral zone and the central optical zone is most preferably needed for enabling separate and independent designs of the central optical zone and the peripheral zone and for ensuring a continuous transition from the central optical zone to the peripheral zone. With a peripheral blending zone 20 between the central optical zone and the peripheral zone 15, a contact lens can be produced to have flexion points and/or sharp edges at the junction between two zones being eliminated and thereby provide improved wearer's comfort. In addition, the peripheral blend zone 20 between the central optical zone and the peripheral zone can de-couple the optical features and the mechanical stabilization and translation features of the lens, thus preventing the introduction of prism into the optics. The peripheral blending zone 20 has a surface which ensures that the peripheral zone, the blending zone and the central optical zone are tangent to each other. The blending zone of the invention can be any surface described by a mathematical function, preferably a spline-based mathematical function, or made of different surface patches.

A "vertical meridian" refers to an imaginary line running vertically from the top, through the center, to the bottom of the anterior surface of a contact lens when said contact lens is maintained at a predetermined orientation on an eye. A "horizontal meridian" refers to an imaginary line running horizontally from the left side, through the center, to the right side of the anterior surface of a contact lens when said contact lens is maintained at a predetermined orientation on an eye. The horizontal and vertical meridians are perpendicular to each other.

"Surface patches" refer to combinations of curvatures and lines that are continuous in first derivative, preferably in second derivative, from each other.

It should be understood that the peripheral zone can be composed of one or more peripheral bands or regions which are patched together to form a continuous surface. Such peripheral zone can be a continuous surface defined by one or more mathematical functions, preferably by a spline-based mathematical function, or is made of several different surface patches.

The central optical zone of the bifocal contact lens comprises a first optical zone 12, a second optical zone 14, and an optical blend zone 16 between the first and second optical zones 12 and 14.

The first optical zone 12 typically is an intermediate to far distance optical zone for vision at primary gaze. The first optical zone covers the upper portion of the central optical zone. Preferably, the lower boundary line with the optical blending zone of the first optical zone is at or below a horizontal line passing through the center of the central optical zone (the horizontal meridian or line parallel with the horizontal meridian) at least in its central portion 18 (i.e., around the intersection point of the lower boundary line with the vertical meridian or with a line parallel to the vertical meridian and passing through the center of the central optical zone). More preferably, the lower boundary line with the optical blending zone of the first optical zone is below a horizontal line passing through the center of the central optical zone.

The apex of first optical zone 12 preferably coincides with the center of the central optical zone. The optical axis of the lens passes through the apex of the first optical zone and the center of the optical zone of the posterior surface (base curve). The first optical zone can be defined by any mathematical function, for example, a spherical function, a conic function, a biconic function, Zernike polynomials, a spline-based mathematical function or combinations thereof.

The second optical zone 14 typically is a near distance optical zone for down-gaze (for reading). The second optical zone is located below the optical blending zone 16. The vertex center of the second optical zone 14 is preferably located on the vertical meridian or a line parallel to the vertical meridian and passing through the center of the central optical zone, on its boundary line with the optical blending zone, and on the order of 1 mm, below the apex (center point) of the first optical zone 12, though other separation distances are possible. The second optical zone can be defined by any mathematical function, for example, a spherical function, a conic function, a biconic function, Zernike polynomials, a spline-based mathematical function or combinations thereof.

For a segmented bifocal contact lens, such as contact lens 10, the images from both optical zones 12 and 14, on eye 30 (FIGS. 2A and 2B), must be laterally coincident to minimize or eliminate ghost images. Ghost images are caused when the images from multiple optical zones, on eye 30, have lateral separation. The images from both zones will have an axial separation, on eye, typical of a bifocal lens. As embodied herein, the line passing through the vertex center of the second optical zone and the center of curvature at the vertex center of the second optical zone preferably intersects the line passing through the apex of the first optical zone and the center of curvature at the apex of the posterior surface, wherein the intersection point is within 2 mm of the center of curvature at the apex of the base optical surface. Such optical zone may properly align the lateral images near the optical axis of the lens and controls image jump to the wearer.

In the preferred embodiment, the optimal alignment of the second optical zone is controlled by rotating the second optical zone around the apex of the second optical zone. To properly align the lateral images, the line passing through the vertex center of the second optical zone and the center of curvature at the vertex center of the second optical zone should pass through the center of curvature of the (posterior) base curve surface. However, in the preferred embodiment, the asymmetrical stabilization and translation features of the lens require that the line passing through the vertex center of the second optical zone and the center of curvature at the vertex center of the second optical zone intersects the central axis of the posterior (or base curve) surface slightly displaced of the center of curvature.

The first optical zone 12 is separated at least partially or completely by the optical blending zone 16 from the second optical zone 14. The distance between the first and second optical zones along the vertical meridian or a line parallel to the vertical meridian and passing through the center of the central optical zone is preferably 0.5 mm or less, more preferably 0.2 mm or less, even more preferably 0.05 mm or less, most preferably 0.01 mm or less. Where the distance between the first and second optical zones along the vertical meridian or a line parallel to the vertical meridian and passing through the center of the central optical zone is zero, the first optical zone 12 and the second optical zone 14 are tangent at a common tangency point which coincides with the vertex center of the second optical zone.

The optical blending zone preferably has mirror symmetry with respect to a plane cutting through the vertical meridian or a line parallel to the vertical meridian and passing through the center of the central optical zone. The optical blending zone 16 has a surface that ensures a smooth surface transition from the first optical zone 14 to the second optical zone. The present blend zone 16 preferably contains a localized curvature (optical power) much higher than either of the first and second optical zones (12 and 14) so that light will be refracted away from the Macular region of the eye 30. The blending between the first zone 12 (distance) and second zone 14 (near) of a bifocal contact lens design optimizes the imaging properties for the wearer's gazes.

In general, the surface sag difference between the first and second optical zones prevents a smooth surface transition. Therefore, in the preferred embodiment, the magnitude of the curvature of the blend zone surface will be much greater than the curvature of the optical zones. In the preferred embodiment, the blend zone 16 surface will have an inflection predominately in the horizontal direction.

As further shown in FIG. 1, the optical blending zone 16 horizontally extends between the first optical zone 12 and second optical zone 14, from the center point located on the vertical meridian (or a line parallel to the vertical meridian and passing through the center of the central optical zone) to the periphery of the contact lens 10. The optical blending zone 16 also outwardly flares from the vertical meridian towards the periphery of the contact lens 10. The width of the optical blending zone 16 increases toward the periphery of the central optical zone to provide controlled curvature, controlled optical power, and a smooth surface transition to the optical zone-to-lenticular zone blend.

When the pupil is subtended by the blend zone 16, the problems associated with ghost images and blur may occur. The optical blending zone and optical zones configuration 16 of present invention minimizes these problems.

The blend zone 16 can be formed by creating two surfaces that are properly aligned for optimal vision and separated by a distance of 1 mm or less from the vertex center of the second optical zone to the apex of the first optical zone. The second optical zone 14 (near) will be rotated around the vertex center of the second optical zone to laterally align the images from the optical zones. The boundaries, common to the blend zone 16, of the two properly designed and aligned optical zones preferably flare at the periphery in order to maintain a relatively smooth curvature across the blend zone 16. The width of the optical blending zone will be on the order of 0.1 mm at the center (along the vertical meridian or a line parallel to the vertical meridian and passing through the center of the central optical zone) and 1 mm at the periphery. In the preferred embodiment, the bounding curves can be defined by splines or $4^{th}$ order or higher mathematical functions and projected onto the surface.

For example, the central optical zone on the anterior surface of a bifocal contact lens of the invention can be designed as follows. A first optical surface is designed to provide a desired optical power for intermediate and/or long distance version. The central axis of the first optical surface coincides with the central axis of the posterior surface. A first projecting curve on a plane (xy-plane) perpendicular to the central axis of the posterior surface is projected onto the first optical surface to form the boundary line of the first optical zone with the optical blending zone.

Then, a second optical surface is designed to provide a desired optical power for near vision. A second projecting curve on a plane (xy-plane) perpendicular to the central axis of the second optical surface is projected onto the second optical surface to form the boundary line of the second optical zone with the optical blending zone. The designed second optical zone is placed in the central optical zone of the anterior surface by positioning the vertex center of the designed second optical zone at a desired point along the vertical meridian (or a line parallel to the vertical meridian and passing through the center of the central optical zone) below the first optical zone. Preferably, the designed second optical zone is placed in the central optical zone of the anterior surface in a way such that the designed second optical zone and the first optical surface (the portion below the boundary line of the first optical zone with the optical blending zone) are tangent to each other at the vertex center of the designed second optical zone. The positioned second optical zone is then rotated around the vertex center of the second optical zone to properly align the second optical zone in relative to the first optical.

The first and second projecting curves, independently of each other, can be a sixth order mathematical function (eqs. 1 and 2)

$$\text{Upper\_Cut}(t) := \delta + T1 \cdot OZD^2 \cdot (t-0.5)^2 + T2 \cdot OZD^4 \cdot (t-0.5)^4 + T3 \cdot OZD^6 \cdot (t-0.5)^6 \quad (1)$$

$$\text{Lower\_Cut}(t) := -\delta + B1 \cdot OZD^2 \cdot (t-0.5)^2 + B2 \cdot OZD^4 \cdot (t-0.5)^4 + B3 \cdot OZD^6 \cdot (t-0.5)^6 \quad (2)$$

wherein: δ is the central gap between the first and the second optical zones (i.e., along the vertical meridian);

OZD is the optical zone diameter;

T1 is the $2^{nd}$ order coefficient for the primary (upper) zone;

T2 is the 4th order coefficient for the primary zone;

T3 is the 6th order coefficient for the primary zone;

B1 is the $2^{nd}$ order coefficient for the secondary (lower) zone;

B2 is the 4th order coefficient for the secondary zone;

B3 is the 6th order coefficient for the secondary zone; and t is the parametric parameter [0:1]

Figure 3:
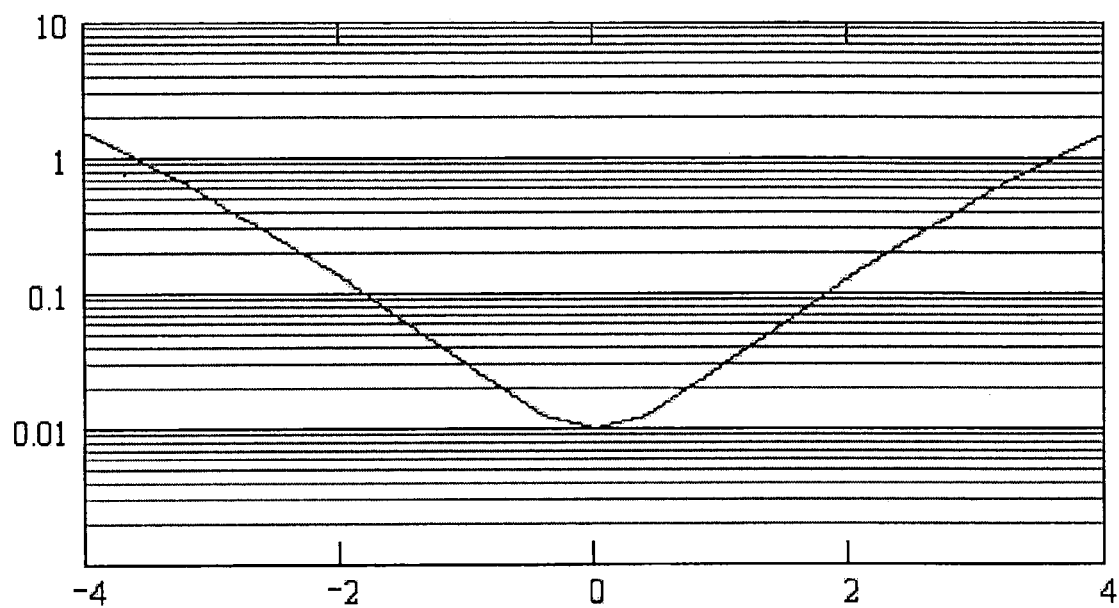
FIG. 3 schematically illustrates gap profile (distance between the first and second optical zones as function of distance to the vertical meridian of the anterior surface of a contact lens according to a preferred embodiment.

FIG. 3 schematically illustrates a gap profile, y-axis, (distance between the first and second optical zones) as function of distance (x-axis) to the vertical meridian of the anterior surface. The boundary line of the first optical zone with the optical blending zone is derived from a projecting curve defined by eq. 1, wherein δ is 0.005 mm, OZD is 8 mm, T1 is 0.02, T2 is 0.0001, and T3 is 0.00001. The boundary line of the second optical zone with the optical blending zone is derived from a projecting curve defined by eq. 2, wherein δ is 0.005 mm, OZD is 8 mm, B1 is 0.005, B2 is −0.003, and B3 is −0.0001.

In a preferred embodiment, the features or surfaces may be curvature continuous across the boundary. Thus, the sag differences between the surfaces cause an inflection in the optical blending zone 16 whereby a variable power intermediate zone is not possible.

In another preferred embodiment, the first optical zone 12 includes a vertically oriented coma-like aberration that is more myopic in the inferior sections of the optical zone. The vertically oriented coma-like aberration will create an intermediate vision zone.

A "coma-like wavefront aberration" refers to a wavefront aberration which is, or is an equivalent of, a wavefront aberration described by any one of third order, fifth order, seventh order Zernike coma-like terms, and combinations thereof in the proposed OSA Standard (Optical Society of America) Zernike Polynomials.

A table of the proposed OSA Standard (Optical Society of America) Zernike Polynomials up to $7^{th}$ order is displayed below (More information on Zernike polynomials is available on http://color.eri.harvard.edu/standardization/standards TOPS4.pdf).

Table of Zernike Polynomials in Polar Coordinates up to $7^{th}$ order (36 terms)

| j | n | m | $Z_n^m (\rho, \theta)$ |
|---|---|---|---|
| 0 | 0 | 0 | 1 |
| 1 | 1 | −1 | $2 \rho \sin \theta$ |
| 2 | 1 | 1 | $2 \rho \cos \theta$ |
| 3 | 2 | −2 | $\sqrt{6} \rho^2 \sin 2\theta$ |
| 4 | 2 | 0 | $\sqrt{3} (2\rho^2 - 1)$ |
| 5 | 2 | 2 | $\sqrt{6} \rho^2 \cos 2\theta$ |
| 6 | 3 | −3 | $\sqrt{8} \rho^3 \sin 3\theta$ |
| 7 | 3 | −1 | $\sqrt{8} (3\rho^3 - 2\rho) \sin \theta$ |
| 8 | 3 | 1 | $\sqrt{8} (3\rho^3 - 2\rho) \cos \theta$ |
| 9 | 3 | 3 | $\sqrt{8} \rho^3 \cos 3\theta$ |
| 10 | 4 | −4 | $\sqrt{10} \rho^4 \sin 4\theta$ |
| 11 | 4 | −2 | $\sqrt{10} (4\rho^4 - 3\rho^2) \sin 2\theta$ |
| 12 | 4 | 0 | $\sqrt{5} (6\rho^4 - 6\rho^2 + 1)$ |
| 13 | 4 | 2 | $\sqrt{10} (4\rho^4 - 3\rho^2) \cos 2\theta$ |
| 14 | 4 | 4 | $\sqrt{10} \rho^4 \cos 4\theta$ |
| 15 | 5 | −5 | $\sqrt{12} \rho^5 \sin 5\theta$ |
| 16 | 5 | −3 | $\sqrt{12} (5\rho^5 - 4\rho^3) \sin 3\theta$ |
| 17 | 5 | −1 | $\sqrt{12} (10\rho^5 - 12\rho^3 + 3\rho) \sin \theta$ |
| 18 | 5 | 1 | $\sqrt{12} (10\rho^5 - 12\rho^3 + 3\rho) \cos \theta$ |
| 19 | 5 | 3 | $\sqrt{12} (5\rho^5 - 4\rho^3) \cos 3\theta$ |
| 20 | 5 | 5 | $\sqrt{12} \rho^5 \cos 5\theta$ |
| 21 | 6 | −6 | $\sqrt{14} \rho^6 \sin 6\theta$ |
| 22 | 6 | −4 | $\sqrt{14} (6\rho^6 - 5\rho^4) \sin 4\theta$ |
| 23 | 6 | −2 | $\sqrt{14} (15\rho^6 - 20\rho^4 + 6\rho^2) \sin 2\theta$ |
| 24 | 6 | 0 | $\sqrt{7} (20\rho^6 - 30\rho^4 + 12\rho^2 - 1)$ |
| 25 | 6 | 2 | $\sqrt{14} (15\rho^6 - 20\rho^4 + 6\rho^2) \cos 2\theta$ |
| 26 | 6 | 4 | $\sqrt{14} (6\rho^6 - 5\rho^4) \cos 4\theta$ |
| 27 | 6 | 6 | $\sqrt{14} \rho^6 \cos 6\theta$ |
| 28 | 7 | −7 | $4 \rho^7 \sin 7\theta$ |
| 29 | 7 | −5 | $4 (7\rho^7 - 6\rho^5) \sin 5\theta$ |
| 30 | 7 | −3 | $4 (21\rho^7 - 30\rho^5 + 10\rho^3) \sin 3\theta$ |
| 31 | 7 | −1 | $4 (35\rho^7 - 60\rho^5 + 30\rho^3 - 4\rho) \sin \theta$ |
| 32 | 7 | 1 | $4 (35\rho^7 - 60\rho^5 + 30\rho^3 - 4\rho) \cos \theta$ |
| 33 | 7 | 3 | $4 (21\rho^7 - 30\rho^5 + 10\rho^3) \cos 3\theta$ |
| 34 | 7 | 5 | $4 (7\rho^7 - 6\rho^5) \cos 5\theta$ |
| 35 | 7 | 7 | $4 \rho^7 \cos 7\theta$ |

A vertically oriented coma-like aberration is wavefront aberration which is, or is an equivalent of, a wavefront aberration described by at least one of the third order coma-like Zernike term Z7, the fifth order coma-like Zernike term Z17, the seventh order coma-like term Z31 and combinations thereof.

In a further preferred embodiment, the optical zones 12,14 can alternately include a spherical aberration that is less myopic at the periphery of each zone. At a distance of 3 mm from the center of any optical zone, the magnitude of spherical aberration will be, on the order of, 1 diopter of all lenses of the series. Typically, a presbyopic eye exhibits 1 diopter or more of spherical aberration that is more myopic in the periphery, for a 6 mm pupil. The actually spherical aberration created in the lens will also be a function of spherical aberration coupling, to the eye, for that lens design and lens material.

In general, the narrow blend zone 16 in the central region will be smoothed over by the manufacturing processes. In the periphery, the magnitude of the optical power will be significantly different than the optical region. In the preferred embodiment, the blend zone 16 to the lenticular region 15 may be asymmetrical to optimize blending in this region. Further, the curvature at the ends of the blend zone 16 can refract off-axis light to the retina such that the light provides a visual cue as to the orientation of the lens 10 for the wearer.

An ophthalmic lens of the invention preferably comprises one or more orientation/stabilization features. Any suitable orientation/stabilization features can be used in the invention. Exemplary orientation/stabilization features include, without limitation, a prism ballast or the like that uses a varying thickness profile to control the lens orientation; a faceted surface in which parts of the lens geometry is removed to control the lens orientation; a ridge feature which orients the lens by interacting with the eyelid, double slab-off features which have a top slab-off zone and a bottom slab-off zone zones to maintain the lens orientation on the eye as well as a visual cue on the lenses so that a wearer can insert the lenses in the proper orientation; non-prism ballast features in the peripheral zone of the lens, disclosed in a co-pending U.S. patent application Ser. No. 60/401,736 filed on Aug. 6, 2002, entitled "Contact lenses" (herein incorporated by reference in its entirety); and the like.

Preferably, the orientation/stabilization features of a contact lens of invention comprises on the anterior surface of the lens a ramped ridge zone, which is described in a copending U.S. patent application Ser. No. 60/398/485 filed on Jul. 24, 2002, entitled "Translating Contact Lens Having A Ramped Ridge", herein incorporated by reference in its entirety. The ramped ridge zone is disposed below the second optical zone and includes an upper edge, a lower ramped edge, a latitudinal ridge that extends outwardly from the anterior surface, and a ramp that extends dowardly from the lower ramped edge and has a curvature or slope that provides a varying degree of interaction between the ramped ridge zone and the lower eyelid depending on where the lower eyelid strikes the ramped ridge zone. The lower eyelid of the eye is engaged with at least some portion of the ramped ridge zone at all times. Such ramped ridge zone can provide wearer's comfort and also is capable of controlling contact lens position on an eye in primary gaze and/or translating amount across the eye when the eye changes from gazing at an object at a distance to gazing at an object at an intermediate distance or at a nearby object. Preferably, when transforming the design of an optimized optical model lens into a mechanical lens design, some common features of a family of contact lenses can be incorporated.

More preferably, the orientation/stabilization features of a contact lens of invention comprises non-prism ballast features in the peripheral zone of the lens, disclosed in a co-pending U.S. patent application Ser. No. 60/401,736 (incorporated herein by reference in its entirety. It was discovered that, when a contact lens has in the peripheral zone (non-optical zone surrounding the optical zone) a lens thickness profile characterized by having a thickness which increases progressively from the top of the lens downwardly along each of the vertical meridian and lines parallel to the vertical meridian until reaching a maximum value at a position between the optical zone and the edge zone and then decreases to the edge of the edge zone, such contact lens can be maintained at a predetermined orientation on an eye. Like a conventional lens ballast, such orientation feature works by weighing the lens at the bottom, causing it to come to an equilibrium position on the eye. With such orientation feature, the optical zone of the anterior surface can be designed independently that can provide an optimal visual performance.

Figures 2A, 2B:
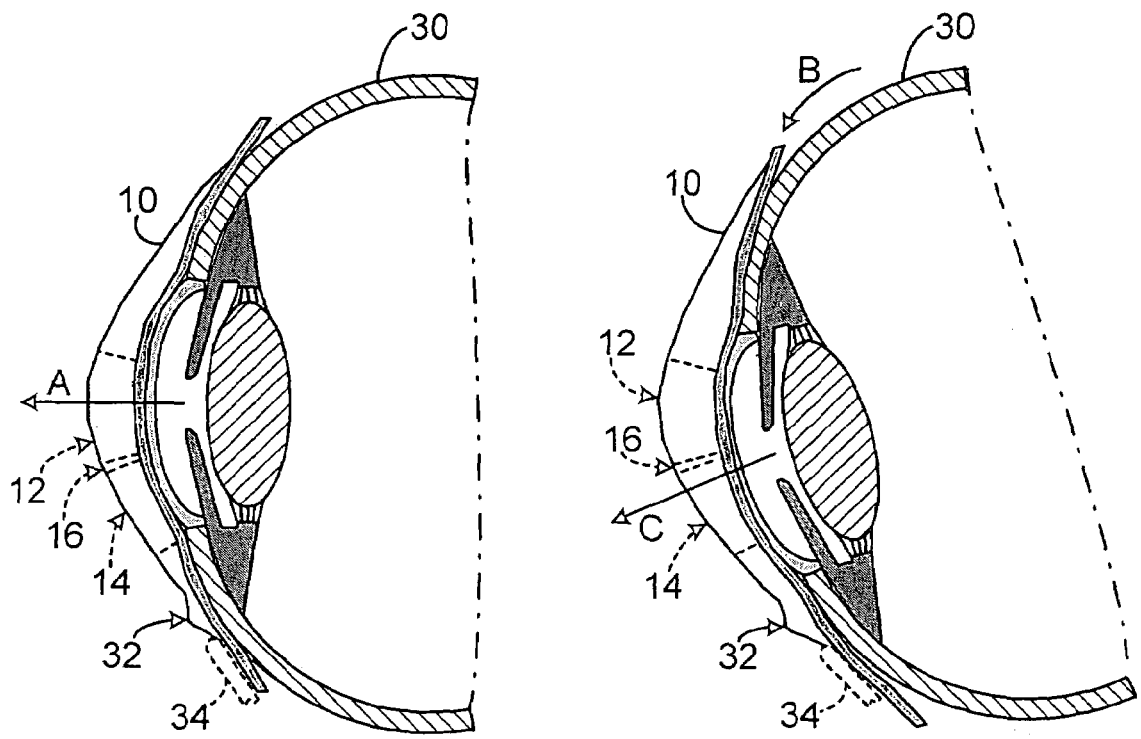
FIG. 2A is a side view of the bifocal contact lens of FIG. 1, on the eye of the wearer (in cross-section), and the contact lens is held in positional alignment with a ridge abutting the lower eyelid of the wearer, and the eye in primary gaze.
FIG. 2B is a side view of the contact lens and eye in FIG. 2A, with the eye in down-gaze and through a near vision zone of the bifocal lens.

With reference to FIG. 2A, the contact lens 10 is shown in situ on the eye 30 of the wearer, and the eye 30 is in primary gaze as shown by Arrow A and looking through the first zone 12 of the contact lens 10. The contact lens 10 includes a ridge 32 that maintains contact lens alignment on the eye 30 such that the first zone 12 stays positioned over the second zone 14, the second optical zone stays positioned over the ridge and the line of sight will properly travel through the optical zones as is more particularly shown in FIG. 2B. The ridge 32 rests on the lower eyelid 34 of the wearer and keeps the optical zones 12 and 14 positionally maintained over the pupil while in primary or down-gaze such that the translation of the lens is only in the vertical direction. The contact lens 10 can includes mechanical features known in the art to positionally maintain the lens in the eye 30, such as ridges, ballasts, slab-offs, and the like.

In FIG. 2B, the eye 30 has rotated, in the direction of Arrow B, such that the line of sight, as shown by Arrow C, now travels through the second zone 14. The position of the contact lens 10, and thus the first zone 12 and second zone 14 are maintained in the eye from the abutting of the ridge 32 against the lower eyelid 34. It can be seen that the line of sight traveled from the first zone 12 through the blend zone 16 and into the second zone 14 as the 30 eye moved downward.

An ophthalmic lens of the invention can be designed using any known, suitable optical design system. Exemplary optical computer aided design systems for designing an optical model lens includes, but are not limited to ZEMAX (Focus Software, Inc.). Preferably, the optical design will be performed using ZEMAX (Focus Software, Inc.). The design of the optical model lens can be transformed by, for example, a mechanical computer aided design (CAD) system, into a set of mechanical parameters for making a physical lens. Any know suitable mechanical CAD system can be used in the invention. The design of an optical model lens may be translated back and forth between the optical CAD and mechanical CAD systems using a translation format which allows a receiving system, either optical CAD or mechanical CAD, to construct NURBs (non-uniform rational B-splines) or Bézier surfaces of an intended design. Exemplary translation formats include, but are not limited to, VDA (verband der automobilindustrie) and IGES (Initial Graphics Exchange Specification). By using such translation formats, overall surface of lenses can be in a continuous form that facilitates the production of lenses having radial asymmetrical shapes. Bézier and NURBs surface are particular advantageous for a lens having a plurality of zones including optical zone and non-optical zones because multiple zones can be blended, analyzed and optimized. More preferably, the mechanical CAD system is capable of representing precisely and mathematically high order surfaces. An example of such mechanical CAD system is Pro/Engineer from Parametric Technology.

When transforming the design of an optical model lens into a set of mechanical parameters, common feature parameters of a family of ophthalmic lenses can be incorporated in the lens designing process. Examples of such parameters include shrinkage, non-optical edge zone and its curvature, center thickness, range of optical power, and the like.

An ophthalmic lens of the invention may be produced by any convenient manufacturing means, including, for example, a computer-controllable manufacturing device, molding or the like. A "computer controllable manufacturing device" refers to a device that can be controlled by a computer system and that is capable of producing directly an ophthalmic lens or optical tools for producing an ophthalmic lens. Any known, suitable computer controllable manufacturing device can be used in the invention. Exemplary computer controllable manufacturing devices includes, but are not limited to, lathes, grinding and milling machines, molding equipment, and lasers. Preferably, a computer controllable manufacturing device is a two-axis lathe with a 45° piezo cutter or a lathe apparatus disclosed by Durazo and Morgan in U.S. Pat. No. 6,122,999 (herein incorporated by reference in its entirety), or is a numerically controlled lathe, for example, such as Optoform® ultra-precision lathes (models 30, 40, 50 and 80) having Variform® or Varimax piezo-ceramic fast tool servo attachment from Precitech, Inc.

Preferably, contact lenses are molded from contact lens molds including molding surfaces that replicate the contact lens surfaces when a lens is cast in the molds. For example, an optical cutting tool with a numerically controlled lathe may be used to form a metallic optical tool incorporating the features of the anterior surface of a contact lens of the invention. The tool is then used to make anterior surface molds that are then used, in conjunction with posterior surface molds, to form the lens of the invention using a suitable liquid lens-forming material placed between the molds followed by compression and curing of the lens-forming material.

Preferably, an ophthalmic lens of the invention or the optical tool to be used for making the same is fabricated by using a numerically controlled lathe, for example, such as Optoform® ultra-precision lathes (models 30, 40, 50 and 80) having Variform® or Varimax piezo-ceramic fast tool servo attachment from Precitech, Inc, according to a method described in a co-pending U.S. Patent Application of CibaVision, entitled Method for Manufacturing a contact lens, (U.S. Ser. No. 60/398,495, filed on Jul. 24, 2002), herein incorporated by reference in its entirety.

As an illustrative example, production of a translating contact lens having a ramped ridge zone having a latitudinal ridge is created via the following process. First, a user defines a set of parameters, such as a surface tolerance, a concentricity tolerance, orientation of the lens design, the number of semi-diameter spokes to be generated for each of the anterior and posterior surfaces, creating zero point at 0,0, orientation of Z-axis, and type of lens surface (concave or convex surface) to be converted into a geometry. A "surface tolerance" refers to the allowed position-deviation of a projected point from an ideal position on a surface of a lens design. The deviation can be in the direction either parallel or perpendicular to the central axis of a lens design. A "concentricity tolerance" refers to the allowed deviation of a point from a given arc. A "semi-diameter spoke" refers to a curve radiating outwardly from the central axis and is perpendicular to the central axis and projected onto the surface. "Evenly-spaced semi-diameter spokes" means that all semi-diameter spokes radiate outwardly from the central axis and separate from each other by one equal angle. A "point spacing" refers to a distance between two points along the semi-diameter spoke.

Second, a user determines the point density to be projected onto the surface of the lens design (for example, the anterior surface) along each of the number of evenly-spaced semi-diameter spokes in a direction parallel to the central axis. A semi-diameter spoke at an azimuthal angle corresponds to the feature that deviates most from the base conic surface, and is selected as the semi-diameter probing spoke. Evenly-spaced points are projected along the semi-diameter probing spoke, in which each pairs of points are separating by a point spacing of typically 10 microns. Then all of the projected points are divided into a series of groups, with each group composed of three consecutive points, a first point, a middle point, and a third point. Each of the points can belong to either one group or two groups. One group is analyzed at a time from the central axis to the edge, or from the edge to the central axis, from the curvature of the surface at the middle point of the group by comparing a distance between the middle point and a line linking the first point and the third point of the corresponding group with the predetermined surface tolerance. If the distance between the middle point and the line linking the first and third points of the group is larger than the predetermined surface tolerance, the curvature of the surface at that point is sharp and an additional point is projected between the first and the middle points in that group. The point spacing between the first and additional points is equal to point spacing between the additional and middle points. After adding an additional point, all of the points included the newly added point is regrouped again and the curvature of the surface at the middle point of each of the series of groups is analyzed. Such iterative procedure is repeated until the distance between the middle point of each of the series of groups and the line linking the first and the third points of corresponding group along the probing spoke is equal to or less than the predetermined surface tolerance. In this manner, the number of the points to be projected onto the surface of the lens design along each of the desired number of evenly-spaced semi-diameter spokes and point spacing for a series of pairs of neighboring points are determined.

The above-determined number of points is then projected onto the anterior surface of the lens design along each of 24, 96 or 384 semi-diameter spokes, in the preferred embodiment. Other numbers of spokes are possible. For each of the semi-diameter spokes, a semi-meridian that is continuous in first derivative is generated. The semi-meridian includes a series of arcs and, optionally, straight lines wherein each arc is defined by fitting at least three consecutive points into a spherical mathematical function within a desired concentricity tolerance. Each of the straight lines is obtained by connecting at least three consecutive points. Preferably, the arc-fitting routine is started from the central axis to the edge. Similarly, conversion of the posterior surface of the lens design into geometry can be carried out according to the above-described procedure.

After converting the lens design to geometry of a contact lens to be produced in a manufacturing system, a mini-file, or equivalent format, containing both the information for the header and the information about the geometry of the lens is generated. This mini-file also contains a zero semi-meridian that is based on the average height of each of the other meridians at each of radial locations and that gives the Variform or Varimax a zero position on which it can base its oscillation calculations. In this mini-file, all semi-meridians have the same number of zones. This is accomplished by copying the last zone of a semi-meridian for a number of times to equalize the numbers of zones for all meridians. After the mini-file is completed, it is loaded into an Optoform® ultra-precision lathe (models 30, 40, 50 or 80) having Variform® piezo-ceramic fast tool servo attachment and run to produce a translating contact lens.

The present invention also provides a method of manufacturing an ophthalmic lens worn on the surface of the eye 30, such as contact lens 10, and having a blended design for a segmented optical zone including the steps of designing the anterior surface and the posterior surface the ophthalmic lens, wherein the anterior includes a vertical meridian, a horizontal meridian, a central optical zone having at least a first optical zone for primary gaze, a second optical zone for down-gaze and an optical blending zone between the first and second optical zones. The optical blending zone has a surface that ensures a smooth surface transition from the first optical zone to the second optical zone and that allows the first and second optical zone to be designed independently and optimally so that ghost images or blur from the transition between the first and second optical zones can be minimized or eliminated. In a preferred embodiment, the optical blending zone preferably has mirror symmetry with respect to a plane cutting through the vertical meridian, outwardly flares from the vertical meridian towards the periphery of the contact lens 10. The width of the blend zone 16 increases toward the periphery of the optical zones to provide controlled curvature, controlled optical power, and a smooth surface transition to the optical zone-to-lenticular zone blend. The optical blend zone can also include a curvature magnitude to refract light away from the macular region of the eye.

The manufacturing method of the invention preferably further comprises a step of producing an ophthalmic lens by a manufacturing means as described above.

Design of the anterior surface can also be performed according to information for vision correction for an eye 30 of a potential lens wearer.

While the foregoing disclosure shows illustrative embodiments of the invention, it should be noted that various changes and modifications could be made herein without departing from the scope of the invention as defined by the appended claims. Furthermore, although elements of the invention may be described or claimed in the singular, the plural is contemplated unless limitation to the singular is explicitly stated.

What is claimed is:

1. An ophthalmic lens worn on the surface of an eye and having a blended design for a segmented optical zone, comprising an anterior surface and an opposite posterior surface, wherein the anterior surface includes a vertical meridian, a horizontal meridian, a central optical zone having at least a first optical zone for primary gaze, a second optical zone for down-gaze and an optical blending zone between the first and second optical zones,
wherein the ophthalmic lens is characterized by having minimal or no ghost images or blur when transitioning between the first and second optical zones,
wherein the first optical zone is located in the upper portion of the central optical zone and the second optical zone is located in the lower portion of the central optical zone,
wherein the optical blending zone has a surface that ensures a smooth surface transition from the first optical zone to the second optical zone and that allows the first and second optical zone to be designed independently and optimally so that ghost images or blur from the first and second optical zones is minimized or eliminated,
wherein the apex of first optical zone coincides with the center of the central optical zone, wherein the vertex center of the second optical zone is located at the intersection point of the vertical meridian or a line which is parallel to the vertical meridian and passes through the center of the central optical zone with its boundary line with the optical blending zone, and the distance between the vertex center of the second optical zone and the apex of the first optical zone is 1.5 mm or less.

2. The ophthalmic lens of claim 1, wherein a first line passing through the vertex center of the second optical zone and the center of curvature at the vertex center of the second optical zone intersects a second line passing through the apex of the first optical zone and the center of curvature at the apex of the posterior surface, wherein the intersection point is within 2 mm or less of the center of curvature at the apex of the base optical surface.

3. The ophthalmic lens of claim 1, wherein the distance between the first and second optical zones along the vertical meridian or a line parallel to the vertical meridian and passing through the center of the central optical zone is 1.0 mm or less.

4. The ophthalmic lens of claim 3, wherein the distance between the first and second optical zones along the vertical meridian or a line parallel to the vertical meridian and passing through the center of the central optical zone is 0.05 mm or less.

5. The ophthalmic lens of claim 1, wherein the optical blending zone has a mirror symmetry with respect to a plane cutting through the vertical meridian or a line parallel to the vertical meridian and passing through the center of the central optical zone.

6. The ophthalmic lens of claim 5, wherein the surface of the optical blending zone has a localized curvature or optical power much higher than either of the first and second optical zones so that the optical blend zone will refract light away from the macular region of the eye of the wearer.

7. The ophthalmic lens of claim 5, wherein the width of the optical blending zone increases from the vertical meridian or a line parallel to the vertical meridian and passing through the center of the central optical zone to the periphery of the central optical zone.

8. The ophthalmic lens of claim 6, wherein the width of the optical blending zone is 0.1 mm or less at the center and 1 mm or less at the periphery of the central optical zone.

9. The ophthalmic lens of claim 1, wherein the ophthalmic lens includes mechanical features to maintain positional and rotational stability of the lens on the eye.

10. The ophthalmic lens of claim 9, wherein the mechanical features are selected from the group consisting of: a prism ballast that uses a varying thickness profile to control the lens orientation; a faceted surface in which parts of the lens geometry is removed to control the lens orientation; a ridge feature which orients the lens by interacting with the eyelid; double slab-off features which have a top slab-off zone and a bottom slab-off zone zones to maintain the lens orientation on the eye; and non-prism ballast features in the peripheral zone of the lens, the peripheral zone surrounding the optical zone of the lens.

11. The ophthalmic lens of claim 10, wherein the ophthalmic lens comprises on the anterior surface a ramped ridge zone which is disposed below the optical zone and includes an upper edge, a lower ramped edge, a latitudinal ridge that extends outwardly from the anterior surface, and a ramp that extends dowardly from the lower ramped edge and has a curvature or slope that provides a varying degree of interaction between the ramped ridge zone and the lower eyelid of an eye depending on where the lower eyelid strikes the ramped ridge zone.

12. The ophthalmic lens of claim 10, wherein the anterior surface has a peripheral blending zone extending outwardly from the central optical zone, a peripheral zone surrounding the blending zone, and an edge zone circumscribing and tangent to the peripheral zone, wherein the peripheral blending zone has a surface which ensures that the peripheral zone, the peripheral blending zone and the central optical zone are tangent to each other, wherein the peripheral zone has a surface that, in combination with the posterior surface, provides in the peripheral zone of the lens a thickness profile which is characterized (1) by having a lens thickness which increases progressively from the top of the lens downwardly along each of the vertical meridian and lines parallel to the vertical meridian until reaching a maximum value at a position between the anterior optical zone and the edge zone and then decreases to the edge of the edge zone, or (2) by having a mirror symmetry with respect to a plane cutting through the vertical meridian, by having a substantially constant thickness in a region around the horizontal meridian and by having a thickness which decreases progressively from the horizontal meridian to the top or bottom of the contact lens along each of the vertical meridian and lines parallel to the vertical meridian.

13. The ophthalmic lens of claim 1, wherein the first optical zone include a vertically oriented coma-like aberration that is more myopic in the inferior sections of the optical zone to create an intermediate vision region.

14. The ophthalmic lens of claim 1, wherein the first and/or second optical zones include spherical aberration that is less myopic in the periphery of that optical zone.

15. The ophthalmic lens of claim 1, wherein the first and second optical zones provide a cylindrical optical power to correct astigmatic vision errors.

16. The ophthalmic lens of claim 1, wherein the outward flares of the blend zone will refract off axis light to the retina of the eye such that the light provides a visual cue as to the orientation and/or translation of the lens.

17. A method of manufacturing an ophthalmic lens worn on the surface of the eye and having a blended design for a segmented optical zone, comprising the steps of:
designing the anterior surface and the posterior surface the ophthalmic lens, wherein the anterior includes a vertical meridian, a horizontal meridian, a central optical zone having at least a first optical zone for primary gaze, a second optical zone for down-gaze and an optical blending zone between the first and second optical zones,
wherein the first optical zone is located in the upper portion of the central optical zone and the second optical zone is located in the lower portion of the central optical zone, wherein the first and second optical zones are designed independently from each other and in a way so that ghost images or blur from transition between the first and second optical zones is minimized or eliminated, wherein the optical blending zone has a surface that ensures a smooth surface transition from the first optical zone to the second optical zone and that allows the first and second optical zone to be designed independently and optimally so that the designed lens is characterized by having minimal or non ghost images or blur when transitioning between the first and second optical zones.

18. The method of claim 17, wherein the apex of first optical zone coincides with the center of the central optical zone, wherein the vertex center of the second optical zone is located at the intersection point of the vertical meridian or a line parallel to the vertical meridian and passing through the center of the central optical zone with its boundary line with the optical blending zone, and the distance between the vertex center of the second optical zone and the apex of the first optical zone is 1 mm or less.

19. The method of claim 18, wherein a first line passing through the vertex center of the second optical zone and the center of curvature at the vertex center of the second optical zone intersects a second line passing through the apex of the first optical zone and the center of curvature at the apex of the posterior surface, wherein the intersection point is within 2 mm or less of the center of curvature at the apex of the base optical surface.

20. The method of claim 19, wherein the distance between the first and second optical zones along the vertical meridian or a line parallel to the vertical meridian and passing through the center of the central optical zone is 0.5 mm or less.

21. The method of claim 18, wherein the optical blending zone has a mirror symmetry with respect to a plane cutting through the vertical meridian or a line parallel to the vertical meridian and passing through the center of the central optical zone and has a localized curvature or optical power much higher than either of the first and second optical zones so that the optical blending zone will refract light away from the macular region of the eye of the wearer.

22. The method of claim 21, wherein the width of the optical blending zone increases from the vertical meridian or a line parallel to the vertical meridian and passing through the center of the central optical zone to the periphery of the central optical zone.

23. The method of claim 22, wherein the width of the optical blending zone is 0.1 mm or less at the center and 1 mm or less at the periphery of the central optical zone.

24. The method of claim 18, wherein the ophthalmic lens includes mechanical features to maintain positional and rotational stability of the lens on the eye.

25. The method of claim 18, wherein the first optical zone includes a vertically oriented coma-like aberration that is more myopic in the inferior sections of that optical zone to create an intermediate vision region.

26. The method of claim 18, wherein the first and/or second optical zones include spherical aberration that is less myopic in the periphery of that optical zone.

27. The method of claim 18, wherein the first and second optical zones provide a cylindrical optical power to correct astigmatism vision errors.

28. The method of claim 18, further comprising the steps of producing the ophthalmic lens by a manufacturing means.

29. The method of claim 28, wherein the manufacturing means is a computer-controllable manufacturing device.

30. The method of claim 29, wherein the computer controllable manufacturing device is a numerically controlled lathe.

* * * * *